Figure 1:
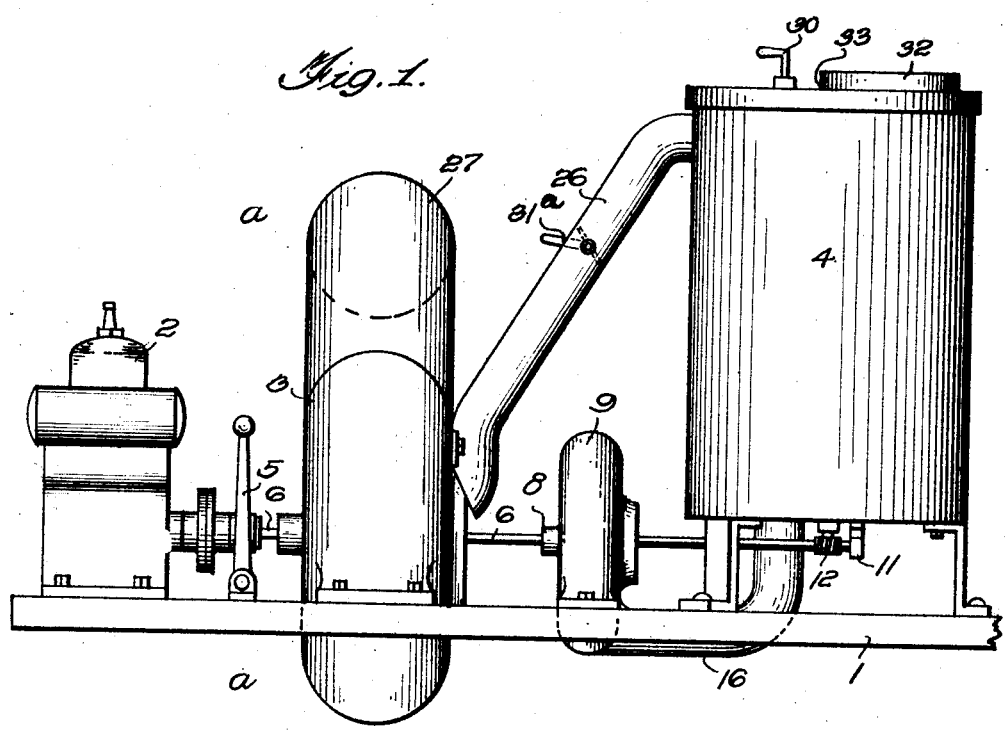
Figure 2:
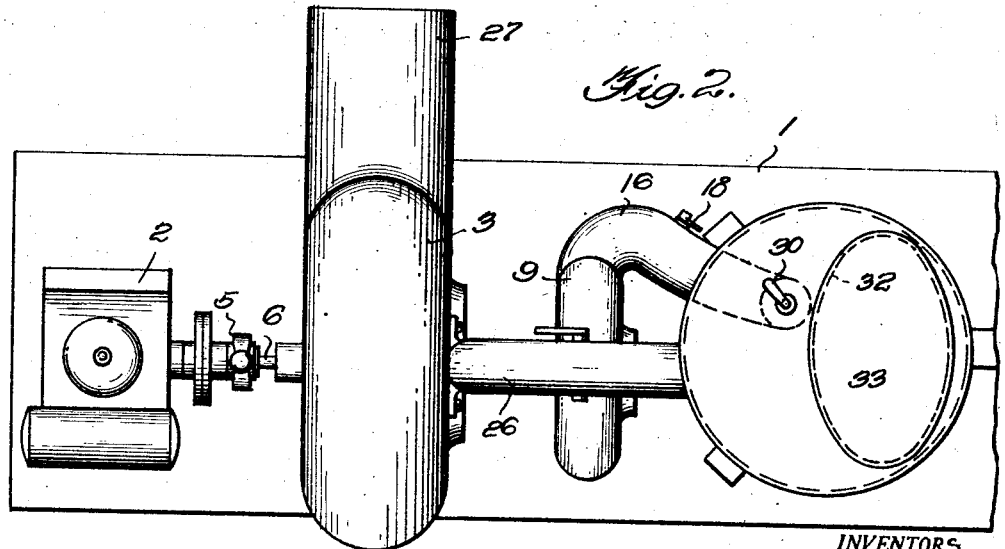

Dec. 23, 1930.   R. R. EZDORF ET AL   1,785,943
AGRICULTURAL DUSTING MACHINE
Filed Feb. 6, 1929   2 Sheets-Sheet 1

INVENTORS
RICHARD R. EZDORF
BY ARTHUR J. BROWN,

ATTORNEY.

Dec. 23, 1930.  R. R. EZDORF ET AL  1,785,943
AGRICULTURAL DUSTING MACHINE
Filed Feb. 6, 1929   2 Sheets-Sheet 2
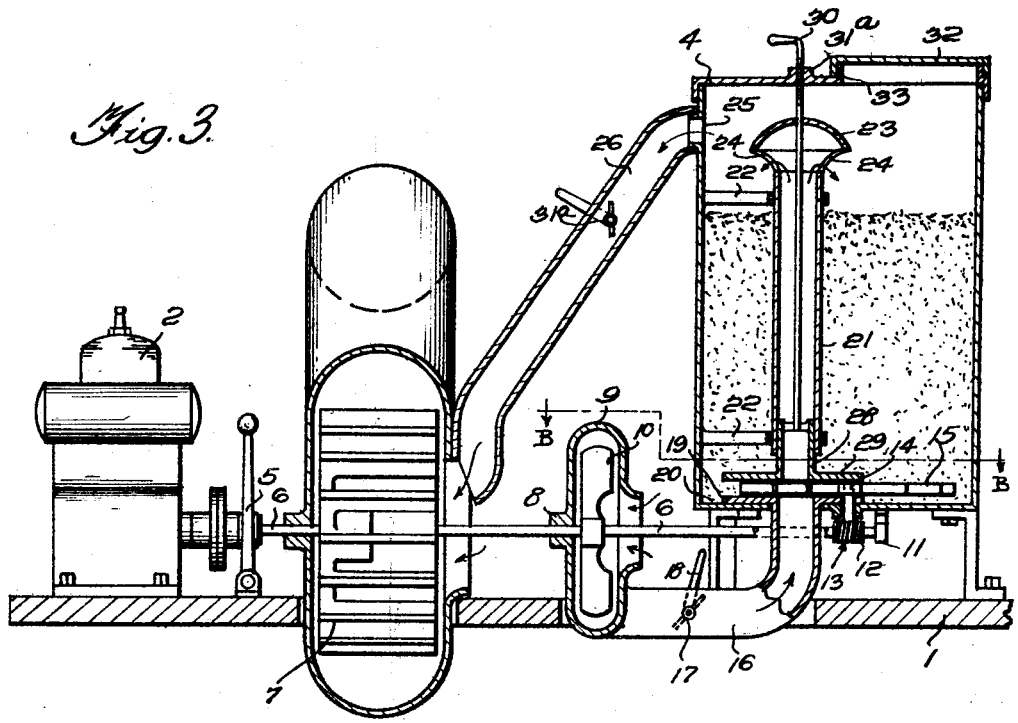
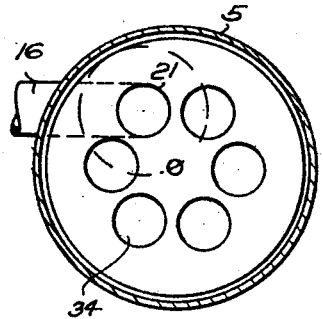
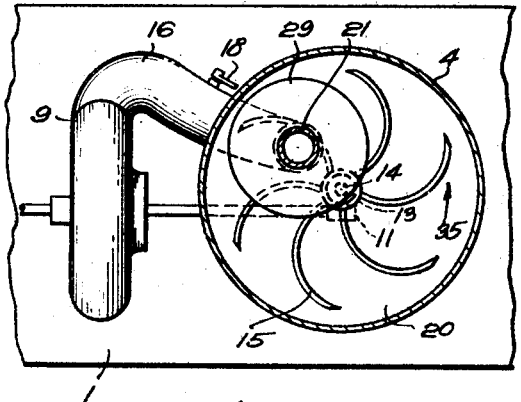
INVENTORS
RICHARD R. EZDORF
ARTHUR J. BROWN,
BY
ATTORNEY.

Patented Dec. 23, 1930

1,785,943

UNITED STATES PATENT OFFICE

RICHARD R. EZDORF, OF WASHINGTON, DISTRICT OF COLUMBIA, AND ARTHUR J. BROWN, OF NEW YORK, N. Y.

AGRICULTURAL DUSTING MACHINE

Application filed February 6, 1929. Serial No. 337,771.

This invention relates to agricultural dusting machines, and more particularly to dusting machines of the type which broadcast or spread the insecticide or fungicide over wide areas of vegetation, as distinguished from that type of machines which confine such distribution to a definite given area, such as one or more rows of growing vegetation.

In the development of the art of the distribution of pulverulent material for the protection of growing crops against insects or disease it has been fully demonstrated that a machine which will thoroughly intermix such materials with the air and discharge the same over the area to be treated is far superior to those which direct the treating materials directly onto the vegetation.

This is true for many reasons, chief of which may be mentioned that by discharging material thoroughly mixed with air over the vegetation and permitting it to drift with the wind currents sufficient moisture is accumulated or picked up by the material to cause it upon settling and coming in contact with the vegetation to readily adhere thereto.

Moreover insects generally are so small they are unable to masticate and digest particles of poisons, except those of microscopic size, or in other words small enough to be carried by ordinary wind currents when discharged into the air over the vegetation.

Another point is that machines which thoroughly intermix the materials with which the vegetation is to be treated with the air do not deposit materials in excess of the quantities required for insect control, or the treatment of plant diseases, and the deposits by such machines are uniform with regard to the various areas of foliage of the identical plant being treated.

It is well known that machines other than of the broadcast type; that is, machines from which the materials are dusted or sifted on the plant or vegetation, bring the powdered materials into contact with only one side of the leaves of the plant. Moreover quantities are deposited in excess of those required to properly do the work and frequently in such quantities as when concentrated on the tender growing buds or parts of the plant to be very injurious.

It thus will be seen in insect and disease control that materials discharged other than so finely pulverized as to be readily carried by wind currents, after being discharged by the machine, are of a minimum or little value (frequently injurious). Also excessive discharges of material are wasteful from an economic standpoint, since such excessive quantities perform no beneficial service the excess is wasted.

In the many experiments and demonstrations in the practical use of dusting machines which we have carried on we have determined that a given volume of air under a given condition of humidity or moisture content, driven from a machine at a given speed, will contain or carry only up to a given quantity of materials of known consistency; and that the speed and direction of the currents of air into which the same is discharged is a factor which must be given due consideration in performing dusting operations of the type contemplated by this invention. Accordingly we have shown in the accompanying drawing and embodied in this description essentials of a machine capable of thoroughly intermixing predetermined or known quantities of materials with air currents of known capacity and velocity, and which is capable of modifying and controlling these requisite factors in a practical and simple manner.

The invention may be readily understood by those skilled in the art from the following specifications, together with accompanying drawing in which Figure I is a side elevation of the machine not showing wheels or trucks for support.

Figure II is the top plan view of Figure I.

Figure III is a sectional view of Figure I.

Figure IV is a detail view taken on line B—B of Figure III, showing material collector.

Figure V is a modification of Figure IV.

In the several figures like references designate like parts.

1 is the framework upon which the motor 2, fan 3 and material container or hopper 4 and other essential parts are mounted. Any suitable support, such as a pair of trucks or wheels, may be used to support or transport the machine from place to place and while in operation. Any suitable or conventional means may be used as a source of power for such transportation, such as a span of mules or a farm tractor, these things being so well known as to require no elaboration here.

5 is a clutch of conventional make used to engage shaft 6 with motor 2, whereby to transmit power to fan impeller 7 shown clearly in Figure III. It will be understood that the motor 2 is preferably of conventional gasoline driven type, with suitable speed control mechanism for operating the apparatus within such range of varying speeds as desired. Shaft 6 extends through fan 3 (supporting impeller 7) through bearing 8, in auxiliary fan housing 9, and carries in said housing auxiliary fan impeller 10, the purpose of which will be more clearly set out in this description.

This shaft 6 extends to bearing 11 and has secured thereon worm 12 which engages worm wheel 13, through which rotation is transmitted to shaft 14, detachably secured to the upper extremity of which is material collector in the form of a spider 15, shown in detail in Figure IV.

16 is a conduit leading from auxiliary fan 9 into the material hopper 4, in which conduit is located butterfly valve 17, controllable by handle 18, whereby the quantity of air emitted by auxiliary fan 9 into the bottom of material hopper 4 may be controlled.

19 is a shelf over that part of the bottom of material hopper 4, surrounding the discharge end of conduit 16 in the bottom of material hopper 4, providing a space 20 about its periphery which serves as a pocket to relieve the material collector of foreign substances, such as stones, nails, etc., which may be contained in the powdered material deposited in the material container 4.

21 is a vertically disposed conduit pipe in material hopper 4, registering with conduit 16, from the auxiliary fan 9, conduit 21 being secured to the inner wall of material container 4 by brackets 22, and having a cap 23 disposed over its upper extremity, with passage 24 provided thereunder for the escape into the upper section of material container 4 of the air from auxiliary fan 9, together with the powder introduced into the air passage between the extremities of the conduits 16 and 21 by material collector 15. The cap 23 also serves to prevent conduit 21 from being filled when the cover 32 is removed and container 4 is being replenished with materials.

The space in the upper section of container 4, about the upper end of conduit 21 and above the material, becomes a separating chamber, the functions of which are herein later more fully described. From this chamber the mixture of air and material is discharged through port 25 in container 4, through conduit 26 into fan 3, from whence it is discharged over the area of vegetation being treated by a current of air generated by fan impeller 7 in fan housing 3. Fan housing 3 may have at its discharge end 27 any suitable type of deflector of elbow whereby to direct or discharge the mixture of air and powder in any desired direction.

It will be noted that telescopically disposed within the lower extremity of conduit 21 is the short section of a conduit 28, which carries at its lower extremity the shelf, or flange, 29, approximately co-extensive with part 19 at the upper extremity of conduit 16, between which two parts material collector 15 rotates and brings the powder into the openings between the extremities of the respective conduits. Conduit 28 may be so adjusted as to vary or control at will the space between elements 19 and 29 by rod 30, which threadedly engages the top of material container 4 at 31.

It will be readily understood that as the space between elements 19 and 29 is increased or decreased the volume of powder carried by the collector therebetween will likewise be increased or decreased. It will also be well understood that as the volume of air may be controlled by butterfly valve 17 the amount of air passing through conduit 16, or intermixing with the material and passing through discharge opening 24 into material container 4, may readily be controlled. To effect further nicety of control a butterfly valve may be inserted into conduit 26 as at 31a.

No specific reference has been made to the particulars of the method by which the motor auxiliary fan or material hopper, or container, is secured to the frame 1, as only conventional methods are employed which are well known in ordinary construction. The worm 12 and worm wheel 13 have been shown exposed for the better purpose of illustration, whereas it is good practice in construction to enclose such parts, which practice is also well understood and conventional in construction operations.

Lid or cover 32 for the opening 33, within the container 4, may be secured into relatively air tight position by any means, such as a thumb screw, not shown.

The material collector 15, shown in detail in Figure IV, being of the contour commonly referred to as a spider, has curved arms traveling in the direction of the arrow 35, Figure IV, collects the material from substantially the entire area of material container 4 and brings it toward the center of the axis of rotation of the material collector and passes it between the elements 19 and 29 and into the space between the registering ends of conduits 16 and 21 to be there engaged by and mixed with air passing from conduit 16 into conduit 21. This type of collector permits of a minimum obstruction to the passage of the air from auxiliary fan 9 into the upper area of container 4.

In Figure V is shown a modified form of collector in which openings 34 are constructed relatively close together so that the space between which will offer the minimum resistance to the passage of the air through the conduits; it being understood of course that openings 34 are designed to register with the passage between the extremities of the conduits 16 and 21. Other forms of material collectors may be used with satisfactory results; likewise all parts illustrated are shown only as embodiments of a preferred type of structure.

The simple operation of our machine is as follows:

Lid or cover 32 is removed from container 4 and materials of the type to be used are deposited into container 4 until it is filled to a point below discharge openings 24 at the upper extremity of conduit 21. The lid is secured into position and the space between elements 19 and 29 adjusted by turning handle or rod 30 (adjustment may be varied at will during operation).

The discharge from fan 3 is directed as desired by discharge nozzle, or elbow, not shown, and motor 2 is started. Clutch 5 connects the motor shaft 6, thus driving fan impeller 7 and auxiliary fan, or blower impeller, 10, the latter discharging the current of air generated, regulated by the butterfly valve 17, through conduit 16, past material collector 15, thence with its mixture of material through the separating chamber in conduit 21 into the upper part of material container 4, through discharge openings 24; thence the thoroughly airified mixture of powder passes through discharge port 25 in container 4, thence through conduit 26, past butterfly valve 31, into the intake side of fan 3, and thence out the fan at discharge opening 27, directed onto the area to be treated as desired. Continued operation causes material collector 15 to continually collect and bring into the passageway between registered conduit 16 and 21 the powder to be mixed with the air which, as heretofore pointed out, may be regulated in quantity by manipulation of rod 30, whereby the space between elements 19 and 29 is adjusted as desired.

Thus it will be seen that we have provided a simple apparatus which enables us to deliver into the air over the vegetation to be treated a properly mixed air and powder which we can control and regulate in accordance with all conditions of humidity of the air and consistency of the powder, together with the speed and direction of the wind into which the discharge is made.

It will be further recognized that the larger particles, or particles not properly disintegrated, passing out of the conduit 21 through passage 24 into the separating chamber in the upper area of tank 4 will fall by gravity onto the top of the material in the container and only particles fine enough to be carried by and thoroughly intermixed with the air will be discharged through discharge opening 25 in material container 4. The heavier particles falling down into the material container 4 will be passed and repassed by material collector 15 between elements 19 and 29, and discharged again and again through openings 24 until disintegration occurs to such a point that the fine particles are carried out by the currents of air through discharge port 25.

Variation of the weight of the material in the container 4 when it is relatively full or relatively empty may call for an adjustment of the space between elements 19 and 29, or of the amount of air passing butterfly valve 17 or butterfly valve 31, in order to control the mixture of air and powder, as desired. This adjustment, however, will be readily understood by any operator, and may easily and readily be accomplished by the simple means at his disposal, in our invention.

Having thus described our invention, what we claim is—

1. In a dusting machine, a material container, means for introducing predetermined quantities of air into the lower extremity of the container, means in the container adjacent the point of the introduction of said air for mixing therewith predetermined quantities of pulverulent material, means whereby the mixture is conveyed into a separation chamber in the upper section of the container, a discharge port in said chamber and means for discharging the mixture from the container.

2. In a dusting machine, a material container, means for introducing predetermined quantities of air into the lower extremity of the container, means in the container adjacent the point of the introduction of said air for mixing therewith predetermined quantities of pulverulent material, a space about the mixing area to receive foreign substances, means whereby the mixture is conveyed into a separation chamber in the upper section of the container, a discharge port in said chamber and means for discharging the mixture from the container.

3. In a dusting machine, a material container, means for introducing predetermined quantities of air into the lower extremity of the container, means in the container adjacent the point of the introduction of said air for mixing therewith predetermined quantities of pulverulent material, means for adjustably regulating the mixing area, means whereby the mixture is conveyed into a separation chamber in the upper section of the container, a discharge port in said chamber and means for discharging the mixture from the container.

4. In a dusting machine, a material container, means for introducing predetermined quantities of air into the lower extremity of the container, means in the container adjacent the point of the introduction of said air for collecting the material from the bottom of the container and mixing therewith predetermined quantities of pulverulent material, means whereby the mixture is conveyed into a separation chamber in the upper section of the container, a discharge port in said chamber and means for discharging the mixture from the container.

5. In a dusting machine, a material container, means for mixing air and material in the bottom of the container, means for conveying the mixture to a point adjacent the top of the container and discharging the same therefrom through an exhaust fan onto an area of vegetation.

6. In a dusting machine, a material container, means for mixing material with air, means for separating heavier particles of material from the mixture and means for exhausting the resultant mixture from the container and distributing it over an area of vegetation.

In testimony whereof we affix our signatures.

RICHARD R. EZDORF.
ARTHUR J. BROWN.